US005360046A

United States Patent [19]
Takada et al.

[11] Patent Number: 5,360,046
[45] Date of Patent: Nov. 1, 1994

[54] HEAVY DUTY TIRE WITH REDUCED SHOULDER WEAR AND IMPROVED WANDERING PERFORMANCE

[75] Inventors: Yoshiyuki Takada, Kobe; Atsushi Yamahira, Nishinomiya, both of Japan

[73] Assignee: Sumitomo Rubber Industries, Ltd., Kobe, Japan

[21] Appl. No.: 709,297

[22] Filed: Jun. 3, 1991

[30] Foreign Application Priority Data

Jun. 15, 1990 [JP] Japan .................................. 2-158199
Mar. 19, 1991 [JP] Japan .................................. 3-081763

[51] Int. Cl.$^5$ .......................... B60C 3/00; B60C 9/20; B60C 11/03
[52] U.S. Cl. .................. 152/454; 152/209 R; 152/532; 152/534
[58] Field of Search ............ 152/454, 532, 534, 209 R

[56] References Cited

U.S. PATENT DOCUMENTS

| | | | |
|---|---|---|---|
| 4,480,671 | 11/1984 | Giron | 152/209 R X |
| 4,724,878 | 2/1988 | Kabe et al. | 152/454 X |
| 5,010,936 | 4/1991 | Numata et al. | 152/454 X |
| 5,042,545 | 8/1991 | Kabe et al. | 152/454 |

*Primary Examiner*—Michael Ball
*Assistant Examiner*—Adrienne C. Johnstone

[57] ABSTRACT

A pneumatic tire for heavy duty use improved in shoulder wear resistance and wandering performance, in which a tread profile extending between tread edges (PT) is formed by an arc having an outwardly swelling curvature of a radius (TR), a buttress profile extending radially inwardly from a point (PB) on the surface of each tire sidewall is formed by an arc having an inward swelling curvature of a radius (BR), a connecting profile extending between each tread edge (PT) and said point (PB) is formed by an arc having an outwardly swelling curvature and intersecting the tread profile at the tread edge (PT) to form a angled corner and smoothly connected with the buttress profile at the point (PB), the ratio (t/m) of the radial distance (t) between the tread edge (PT) and the equatorial point (C) on the tread profile to the axial distance (m) therebetween is 0.09 to 0.12, the ratio (m/L) of the axial distance (m) to the axial distance (L) between the equatorial point (C) and an imaginary point (PS) at which the tread arc having the radius of curvature (TR) and the buttress arc having the radius of curvature (BR) intersect each other, if extended is 0.85 to 0.95, and the inclination angle ($\theta$) or the tangential line (T) to the connecting profile drawn at each tread edge (PT) is 20 to 60 degrees with respect to the radial direction of the tire.

4 Claims, 4 Drawing Sheets

HEAVY DUTY TIRE WITH REDUCED SHOULDER WEAR AND IMPROVED WANDERING PERFORMANCE

The present invention relates to a pneumatic tire for heavy duty use in which shoulder wear is reduced and wandering performance is improved.

BACKGROUND OF THE INVENTION

In the tire for heavy vehicles, e.g. truck, bus and the like, a square shoulder in which, as shown in FIG. 4, an outwardly swelling tread face (a) and inwardly swelling buttress faces (b) intersect at the tread edges at about a right angle, has been used.

Such a square shoulder has a merit of an even ground pressure distribution, and thereby uneven wear becomes less, and the wear life of the tread is excellent.

In tires having the square shoulder, however, the tread edges are liable to be damaged during running on rough roads, and further the directional stability is not good. That is, wandering of the vehicle occurs during running on a road having a surface irregularly inclined in the lateral direction, for example, a rutted road.

The countermeasures for such problems, which have been widely employed, are to use:

a round shoulder in which the tread edge portion (c) is rounded with an arc (R) as shown in FIG. 5; and a taper shoulder in which the tread edge portion is formed by a tapered face (e) as shown in FIG. 6.

However, in tires having the round shoulder, as the ground pressure is decreased in a region near the tread edge, shoulder wear, in which the tread shoulder portions are worn rapidly in comparison with the tread crown portion, occurs. On the other hand, in the tires having the taper shoulder, the improvement in the wandering performance is not sufficient.

SUMMARY OF THE INVENTION

It is therefore, an object of the present invention to provide a heavy duty tire which is improved in both the wandering performance and the shoulder wear performance.

According to one aspect of the present invention, a pneumatic tire for heavy duty has a tread face extending between tread edges (PT), a buttress face extending radially inwardly from a point (PB) on the surface of each tire sidewall, and a connecting face extending between each tread edge (PT) and the above-mentioned point (PB), wherein in a cross section including the tire axis, the tread face is formed by an arc having an outwardly swelling curvature of a radius (TR), each buttress face is formed by an arc having an inward swelling curvature of a radius (BR), each connecting face is formed by an arc having an outwardly swelling curvature and intersecting the tread face at the tread edge (PT) to form a angled corner and smoothly connected with the buttress face at the point (PB), the ratio (t/m) of the radial distance (t) between the tread edge (PT) and the equatorial point (C) on the tread face to the axial distance (m) therebetween is 0.09 to 0.12, the ratio (m/L) of the above-mentioned axial distance (m) to the axial distance (L) between the equatorial point (C) and an imaginary point (PS) at which the tread arc having the radius of curvature (TR) and the buttress arc having the radius of curvature (BR) intersect each other if extended is 0.85 to 0.95, and the inclination angle ($\theta$) or the tangential line (T) to the connecting face drawn at each tread edge (PT) is 20 to 60 degrees with respect to the radial direction of the tire.

BRIEF DESCRIPTION OF THE DRAWINGS

An embodiment of the present invention will now be described in detail with reference to the accompanying drawings, in which.

DETAILED DESCRIPTION OF THE INVENTION

Figure 1:
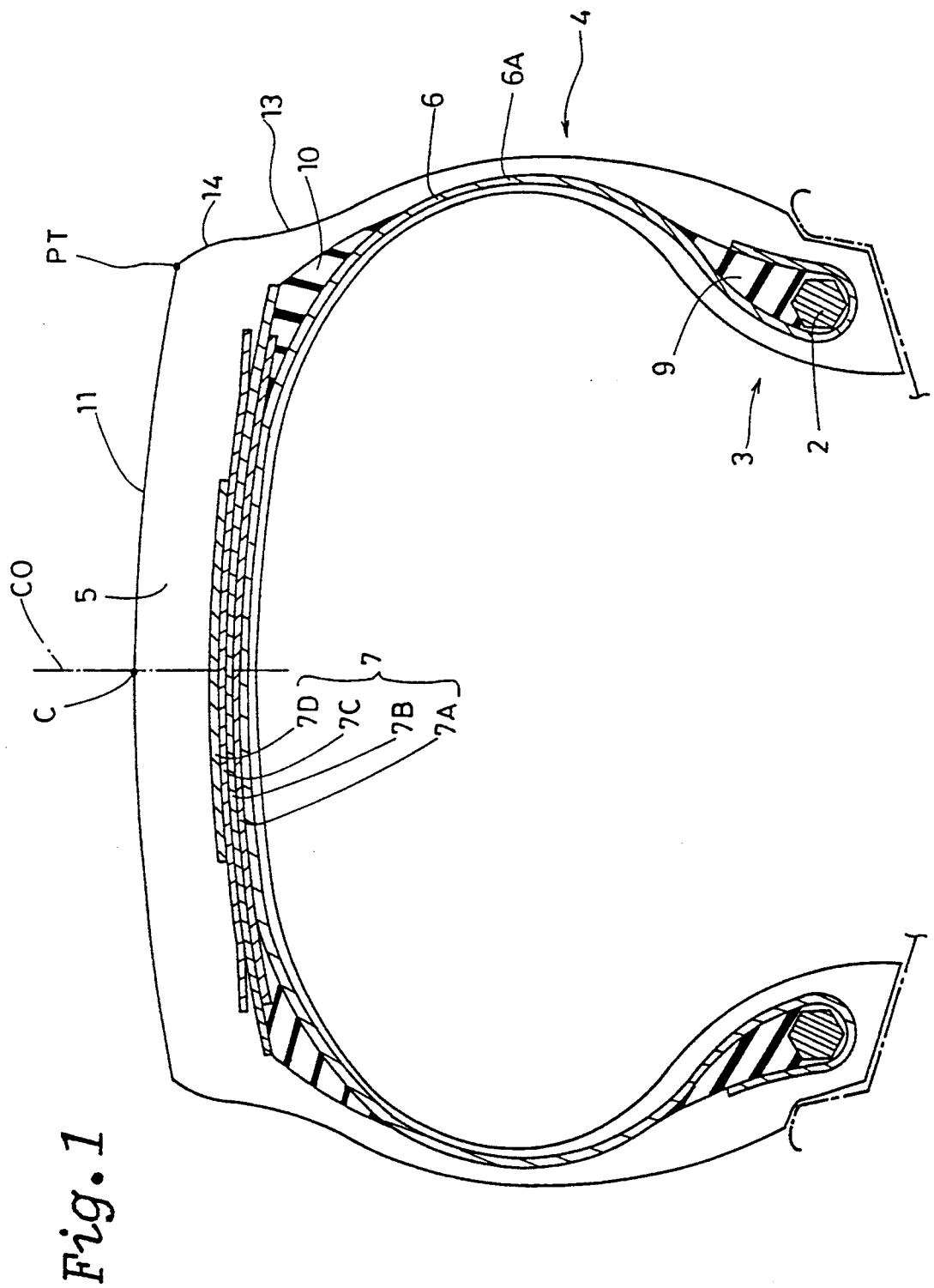
FIG. 1 is a sectional view showing an embodiment of the present invention.

In FIG. 1, heavy duty tire 1 is a truck/bus radial tire having a typical size of 10.00R20-14PR, and its normal inflated state in which the tire is mounted on its regular rim of size 7.50V×20 and inflated to its maximum inner pressure is shown.

The tire 1 has a tread portion 5, a pair of axially spaced bead portions 3 and a pair of sidewall portions 4 extending therebetween.

The tire 1 comprises a pair of bead cores 2 disposed one in each bead portion 3, a carcass 6 having at least one ply of cords extending between the bead portions and turned up around the bead cores form the axially inside to the outside thereof, a stiff belt 7 disposed radially outside the carcass and inside a rubber tread, and a bead apex 9 disposed in each bead portion 3 and between the carcass ply turned up portion and main portion.

In this embodiment, the carcass is composed of one ply 6A of cords arranged radially at an angle of 70 to 90 degrees with respect to the tire equator CO.

For the carcass cords, steel cords are used, but organic fiber cords, e.g. nylon, polyester, rayon, aromatic polyamide and the like and inorganic fiber cords may be used.

The belt 7 in this embodiment is composed of first to fourth plies 7A, 7B, 7C and 7D arranged in this order radially outwardly from the carcass.

The radially innermost first belt ply 7A is composed of steel cords laid at an angle of 40 to 70 degrees with respect to the tire equator CO, and the second to fourth belt plies 7B–7D are each composed of steel cords laid at an angle of 10 to 30 degrees with respect to the tire equator.

With regard to the cord inclinations based on the tire equator, in order to provide a stiff triangular structure for the belt, the first ply 7A and the second ply 7B are inclined in the same direction, but the second ply 7B is inclined in a direction opposite to that of the third ply 7C to cross each other, and further the third ply 7C and the fourth ply 7D are inclined in the same direction.

The belt 7 is disposed radially outside of the carcass, and the major part of the belt or the inner most ply comes into direct contact with the carcass, but between each of the edge portions thereof and the carcass a wedge-shaped breaker cushion 10 made of soft rubber is disposed so as to provide a distance between the belt edge portions and the carcass which increases gradually toward the axially outside of the tire.

Further, in order to effectively disperse and mitigate the share stress liable to concentrate on a region between the breaker cushion and the belt edge portion, the ply edges are shifted such that the second ply 7B is widest, and the first ply 7A has the almost same width as the third ply 7C but slightly narrower, and the radially outermost fourth ply 7D is narrowest.

Furthermore, between each edge portion of the third ply 7C and the second ply 7B, a wedge-shaped rubber strip is disposed to provide a gradually increasing distance therebetween as shown in FIG. 1.

Figure 2:
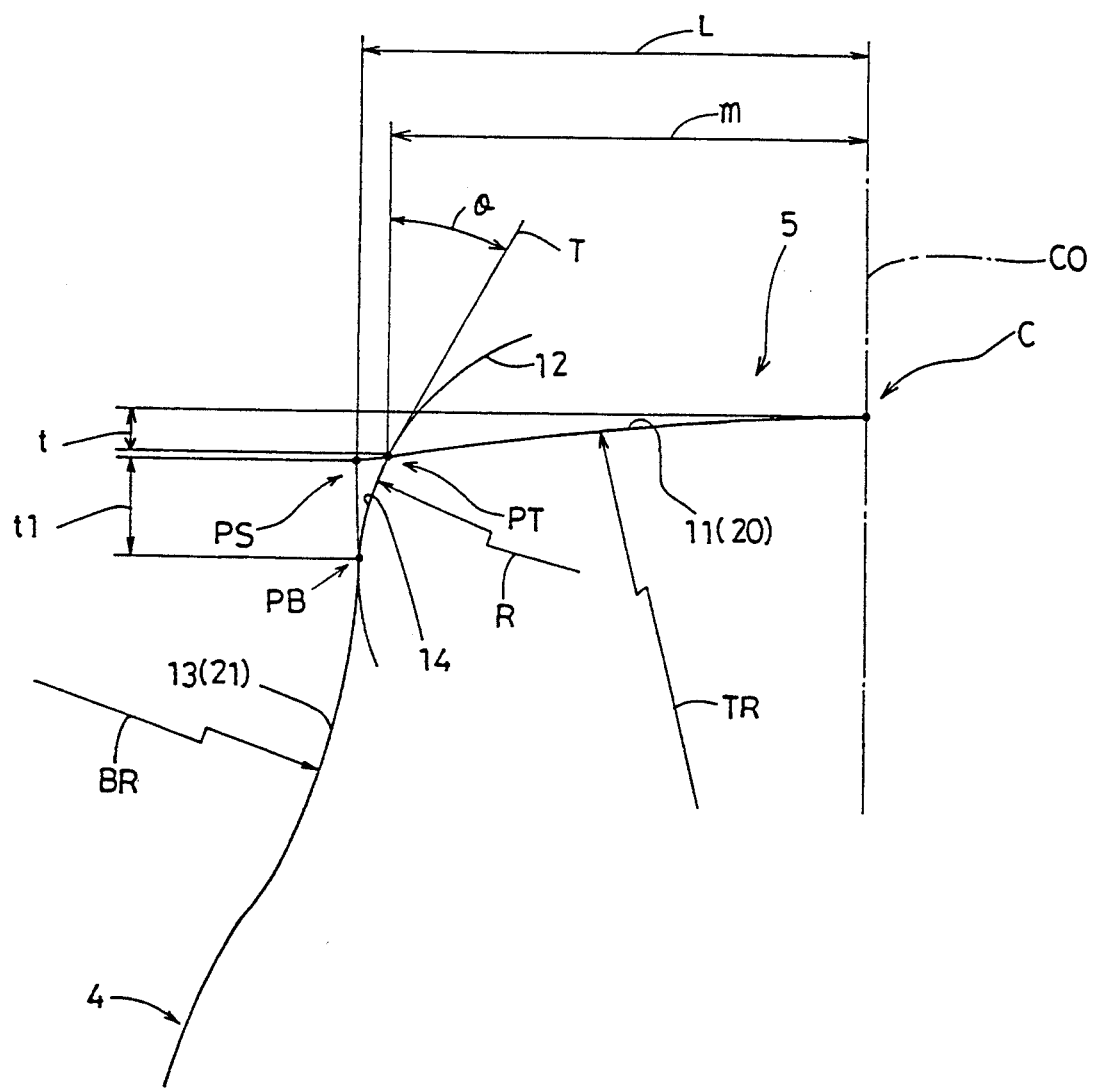
FIG. 2 is a diagram showing the profile thereof.

In the present invention, to effectively improve wandering performance and shoulder wear resistance, the profile of the tire is specifically defined as shown in FIG. 2 which shows a cross section of the tire including the tire axis.

The tire profile comprises a tread profile 11 extending between the tread edges PT, a buttress profile 13 extending radially inwardly from a point PB on each tire sidewall 4, and a connecting profile 14 extending between the point PB and each tread edge PT.

The tread profile 11 is formed by an arc 20 having a single radius of curvature TR, and the center thereof is positioned on the tire equatorial plane so that the tread profile swells radially outwardly of the tire.

The buttress profile 13 is by an arc 21 having a single radius of curvature BR, and the center thereof is positioned axially outward of the sidewall so that the profile swells inwardly of the tire.

The connecting profile 14 is formed by an arc 12 having a single radius of curvature R, and the center thereof is positioned axially inward of the sidewall so as to swell outwardly of the tire.

The connecting profile 14 is smoothly joined to the buttress profile 13 at the above-mentioned point PB. Therefore, the point PB is a point of inflection between the arcs 12 and 13. On the contrary, the connecting profile 14 intersects the tread profile 11 at the tread edge PT at an angle narrower than a straight angle and wider than a right angle so as to form an angled corner.

A tangential line T to the connecting profile 14 drawn at the tread edge PT to extend radially outwardly is inclined axially inwardly at an angle $\theta$ of 20 to 60 degrees with respect to the radial direction, whereby the tread edges are prevented from being torn off.

When the angle $\theta$ is less than 20 degrees, the angle of the tread edge becomes too narrow, and the tread edge is liable to be torn off.

When the angle $\theta$ is more than 60 degrees, a region of the connecting profile 14 near the tread edge contacts with the ground, and shoulder wear start therefrom.

Further, the tread camber defined by the ratio t/m of the radial distance t between the tread edge PT and the central point C on the tread profile at the tire equator to the axial distance m therebetween is set in the range of 0.09 to 0.12. When the ratio t/m is less than 0.09, the ground pressure becomes large in the tread shoulder regions in comparison with the tread central region, and shoulder wear is caused.

On the contrary, when the ratio t/m is more than 0.12, the ground pressure becomes large in the central region, and the central region wears rapidly.

As the connecting profile is formed by the outwardly swelling arc 12, it becomes easy to run over protrusions on the road surface such as rut, rails and the like, and the shock when running over can be softened.

As the tread edge PT is angled and the t/m ratio is 0.09 to 0.12, the ground pressure distribution becomes even, and uneven wear, e.g. shoulder wear of the tread can be reduced.

Furthermore, the ratio m/L of the axial distance m between the tread edge PT and the central point C to the axial distance L between the central point C and an imaginary point PS at which the arc of the radius TR and the arc of the radius BR intersect each other if extended, is set in the range of 0.85 to 0.95, whereby the connecting face 14 is allowed to have a width t1 and the curvature R which are appropriate for a smooth running over a protrusion in a well-balanced manner.

When the ratio m/L is less than 0.85, the resultant increased radius R impairs the running-over performance, and further the ground contacting width is excessively decreased to deteriorate running performance.

When the ratio m/L is more than 0.95, the width t1 is excessively decreased and an effective improvement in the running-over performance is not obtained.

Figure 3:
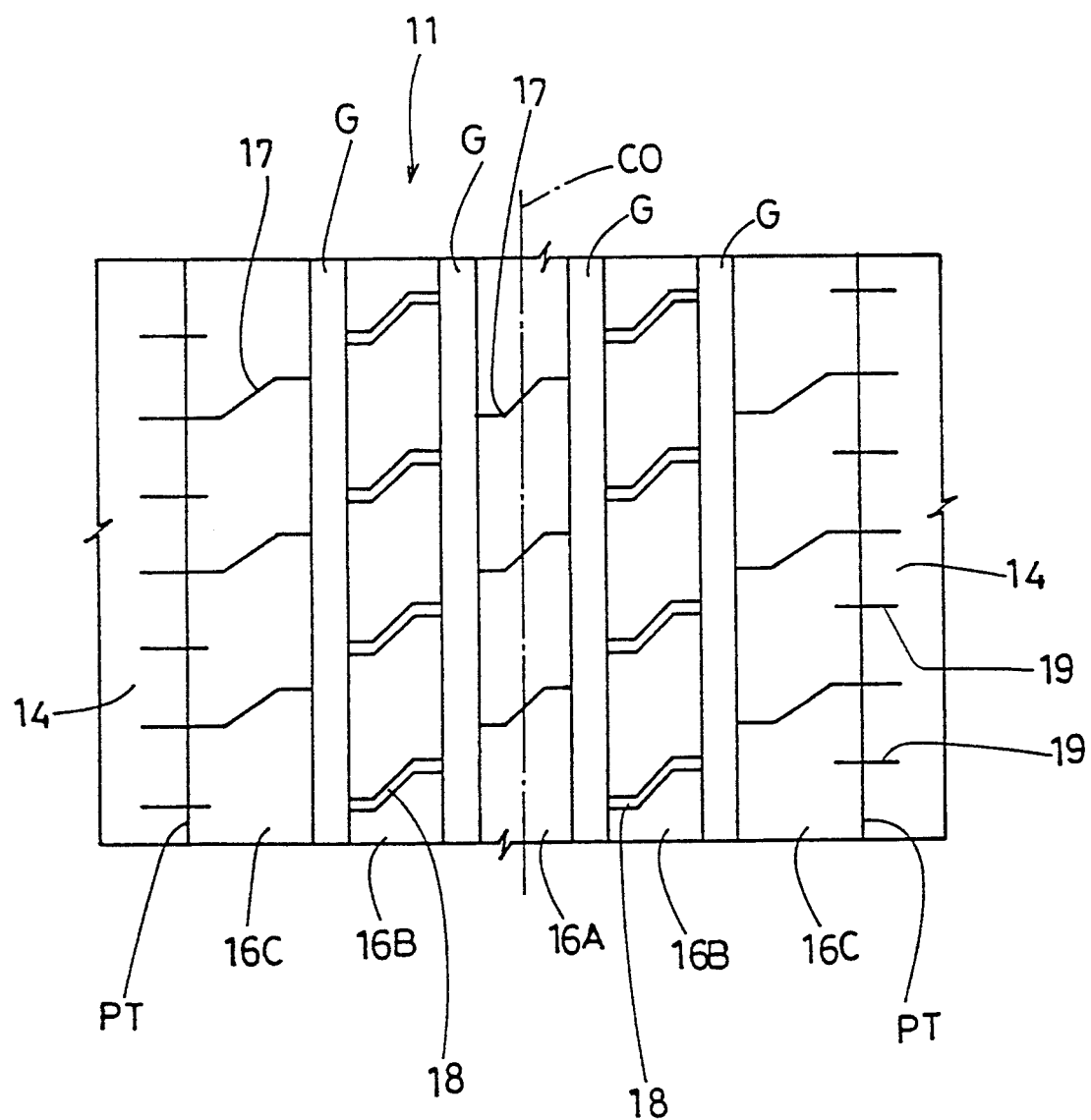
FIG. 3 is a developed plan view showing the tread pattern thereof.

FIG. 3 shows a tread pattern which is suitably for the tire according to the present invention.

The tread is provided with four circumferentially extending main grooves G to divide the tread into five ribs: one central rib 16A, two middle ribs 16B and two shoulder ribs 16C. The central rib 16A and the shoulder ribs 16C are provided with zigzag sipes 17 extending across the whole width of the respective ribs.

The middle ribs 16B are provided with zigzag grooves 18 having the substantially same shape as the sipes 17 but a wider groove width. The grooves 18 extend across the whole width of the respective ribs to divide the ribs into circumferentially separated blocks.

Further, to adjust the rigidity or the tread edge, the tread edge is provided with sipes or cuts 19 extending in the axial direction of the tire from the tread face 11 to the connecting face 14.

The present invention can be applied to semiradial tires and bias tires in addition to radial tires.

Test tires of size 10.00R20 having specifications given in Table 1 were prepared and tested for wandering performance, shoulder wear resistance, tread life and tread edge durability. The test results are also shown in Table 1.

In the wandering performance test, test tires were installed on the front wheels of a test vehicle, and the resultant wandering of the vehicle when running into and out of a rut formed on a rough road and the required handle operation are evaluated into four ranks A–D as the wandering performance by the driver's feeling. (A: excellent, B: good, C: passable, D: bad)

In the shoulder wear test, the test tire was run on a well paved road at a constant speed under the maximum tire load specified in JIS, and the amount of the tread wear was measured at the tread shoulders when the depth of the remaining main grooves reached to 10 mm. (A:small, B:middle, C:large)

In the tread life test, the above-mentioned constant-speed running was continued, and the total running distance until it became necessary to change the test tire to a new tire due to its shoulder wear was measured. The measurements are indicated by an index based on the assumption that prior art tire 2 is 100. The larger the index, the longer the life.

In the edge durability test, when the tire reached the end of tread life in the former test, the tread edges were inspected to find whether the edges were torn off. (A:-none, B:small, C:large)

TABLE 1

Figure 4:
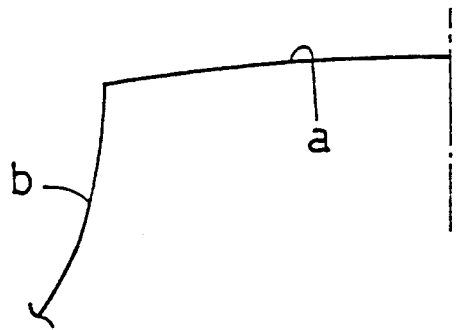
FIGS. 4–6 are schematic sectional views each showing a prior art.
Figure 5:
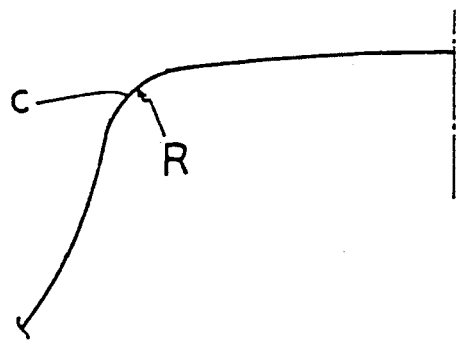
Figure 6:
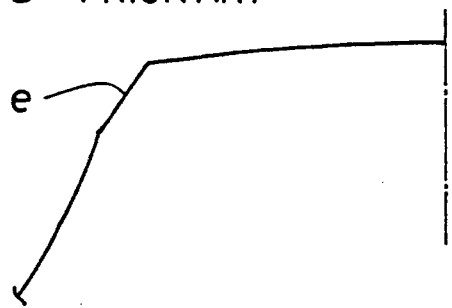

|  | Ex. 1 | Ex. 2 | Ex. 3 | Ref. 1 | Ref. 2 | Prior 1 | Prior 2 | Prior 3 |
| --- | --- | --- | --- | --- | --- | --- | --- | --- |
| Plofile | FIG. 1 | FIG. 1 | FIG. 1 | FIG. 1 | FIG. 1 | FIG. 4 | FIG. 5 | FIG. 6 |
| TR | 450 | 450 | 450 | 450 | 450 | 680 | 575 | 450 |
| BR | 150 | 150 | 150 | 150 | 150 | 120 | 120 | 120 |
| R | 20 | 36 | 30 | 85 | 20 | — | 10 | — |
| θ (deg) | 20 | 60 | 48 | 15 | 65 | — | — | 35 |
| L (mm) | 102 | 102 | 102 | 102 | 102 | 99 | 102.5 | 102 |
| m (mm) | 97 | 87 | 92 | 97 | 97 | 99 | 97.5 | 92 |
| t (mm) | 11.7 | 8.5 | 9.2 | 11.7 | 11.7 | 7.25 | 9.2 | 5 |
| t/m | 0.11 | 0.12 | 0.09 | 0.11 | 0.11 | 0.07 | 0.09 | 0.05 |
| m/L | 0.95 | 0.85 | 0.90 | 0.80 | 0.97 | 1.0 | 0.95 | 0.90 |
| Wandering | B | B | A | D | A | D | B | C |
| Shoulder wear | A | A | A | A | C | A | C | B |
| Tread life | 123 | 118 | 136 | 91 | 82 | 100 | 82 | 90 |
| Tread edge tear | A | A | A | B | A | C | A | A |

We claim:

1. A pneumatic tire for heavy duty having a profile comprising
   a tread profile extending between tread edges (PT),
   a buttress profile extending radially inwardly from a point (PB) on the surface of each tire sidewall, and
   a connecting profile extending between each tread edge (PT) and said point (PB),
   wherein in a cross section including the tire axis,
   the tread profile is formed by an arc having an outwardly swelling curvature of a radius (TR),
   each buttress profile is formed by an arc having an inward swelling curvature of a radius (BR),
   each connecting profile is formed by an arc having an outwardly swelling curvature and intersecting the tread profile at the tread edge (PT) to form a angled corner and smoothly connected with the buttress profile at the point (PB),
   the ratio (t/m) of the radial distance (t) between the tread edge (PT) and the equatorial point (C) on the tread profile to the axial distance (m) therebetween is 0.09 to 0.12,
   the ratio (m/L) of said axial distance (m) to the axial distance (L) between the equatorial point (C) and an imaginary point (PS) at which the tread are having the radius of curvature (TR) and the buttress arc having the radius of curvature (BR) intersect each other if extended is 0.85 to 0.95, and
   the inclination angle ($\theta$) of the tangential line (T) to the connecting profile drawn at each tread edge (PT) is 20 to 60 degrees with respect to the radial direction of the tire.

2. The tire according to claim 1, wherein the tire comprises: further has a carcass (6) having at least one ply of cords extending between a pair of bead portions (3) and turned up around a bead core (2) disposed in each of said pair of bead portions, a rubber tread, and a belt (7) disposed radially outside the carcass and inside said rubber tread.

3. The tire according to claim 2, wherein said at least one carcass ply is composed of steel cords arranged radially at an angle of 70 to 90 degrees with respect to the tire equator CO, and said belt is composed of four plies (7A, 7B, 7C and 7D) of steel cords and has a triangulated cord structure.

4. The tire according to claim 3, further comprising a pair of wedge-shaped cushions, each of said pair of cushions being made of rubber, wherein said belt has a central major part and a pair of edge parts, said major part directly contacting with the carcass, and one of said pair of cushions (10) is disposed between each of said edge parts and the carcass so as to provide a distance therebetween which increases gradually toward the axially outside of the tire.

* * * * *